No. 715,276. Patented Dec. 9, 1902.
A. LAPORTE.
DUMPING CART.
(Application filed May 17, 1902.)

(No Model.)

Witnesses
M. L. Hazard.
Gerald Cooper.

Inventor.
Amédée Laporte.
By Arnold Barber
Attorneys

UNITED STATES PATENT OFFICE.

AMÉDÉE LAPORTE, OF CENTRAL FALLS, RHODE ISLAND.

DUMPING-CART.

SPECIFICATION forming part of Letters Patent No. 715,276, dated December 9, 1902.

Application filed May 17, 1902. Serial No. 107,775. (No model.)

*To all whom it may concern:*

Be it known that I, AMÉDÉE LAPORTE, a resident of Central Falls, in the county of Providence and State of Rhode Island, have invented certain new and useful Improvements in Dumping-Carts; and I do hereby declare that the following is a full, clear, and exact description thereof, reference being had to the accompanying drawings, and to the letters of reference marked thereon, which form a part of this specification.

This invention relates to improvements in dumping-carts which provide suitable mechanism whereby the front end of the cart and the tail-board may be simultaneously released by one movement of a lever, after which the cart may be automatically tipped up and the load dumped by backing the horse and the body drawn back again to its normal position by starting the horse ahead. It is fully described in this specification and illustrated in the annexed drawings.

Figure 1:
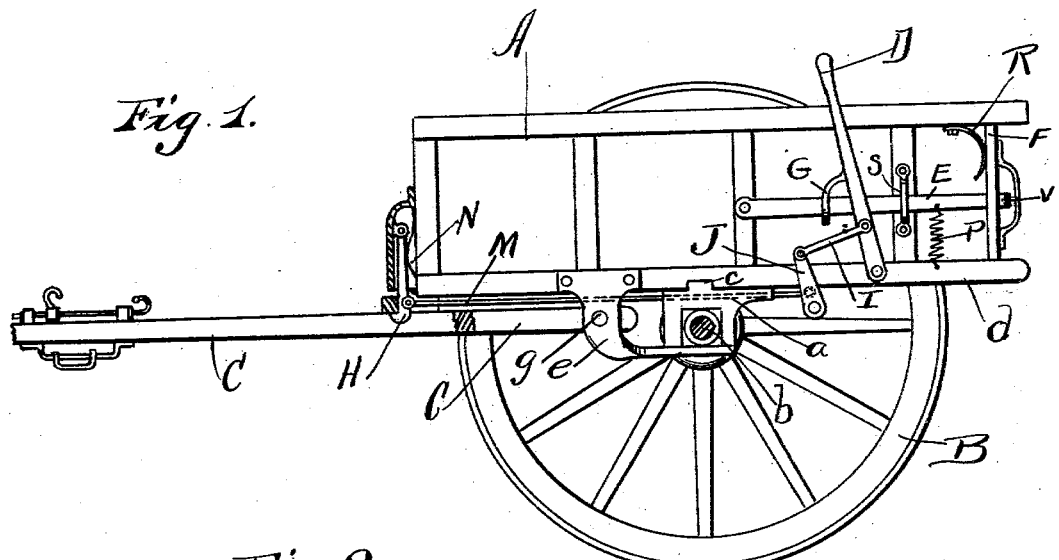
Figure 2:
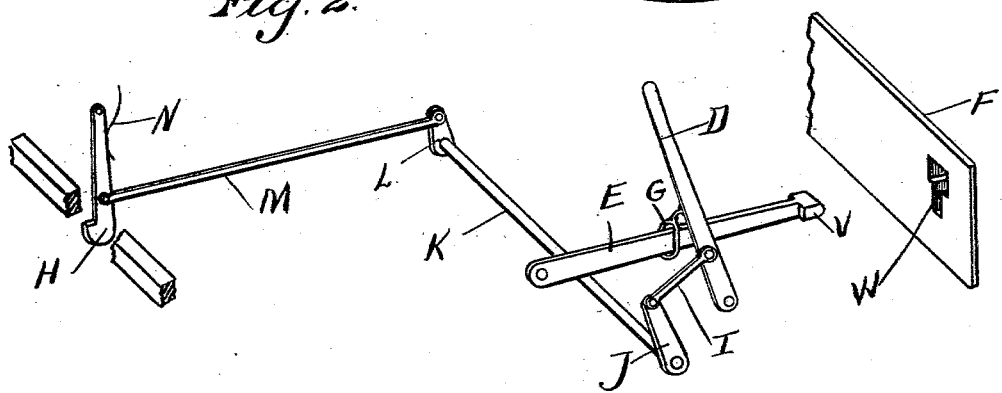
Figure 3:
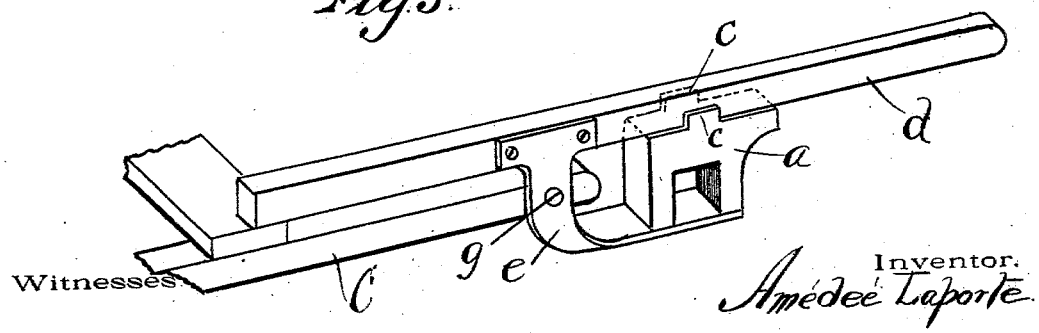

Figure 1 is a side elevation of the cart with one wheel removed, showing the locking and releasing mechanism, one thill broken away, and a portion of the front locking device in section. Fig. 2 is a perspective view of the locking and releasing mechanism and a portion of the tail-board with the body removed. Fig. 3 is a perspective view showing the attachment for automatically dumping the cart with the body and axle removed.

In the construction, A is the body of the cart.

B is the wheel.

C C are the thills.

D is a hand-lever which operates the bolt E through the strap G to release the tail-board F and also by the same operation, through the connection-rod I, crank-arm J, shaft K, short crank L, and connection M, draws back the catch H and releases the forward end of the body. The catch H is held in its forward or locked position by the spring N. The spring R acts on the end of the tail-board, which is secured by the latch-bolt, to throw it off as soon as released.

The latch-bolt E is pivoted at one end and has a T-shaped head V on the outer end. It slides up and down in the guide-strap S, which holds the latch in place and limits its motion. The tail-board F has a T-shaped slot W in it, wide at the top to receive the head and narrow at the bottom to prevent the head from drawing through.

The body of the cart A rests on two forked blocks a, which blocks rest on the axle that passes through them. These blocks are secured to the body by bolts and are also held from moving sidewise by lips c c, which project up on either side of the side bars d. Straps e are bolted to the side bars and then bent down and bolted to the under side of the blocks a, holding the axle firmly in place and at the same time forming an extra support for the block. The thills C C are pivoted at g to the strap e a short distance forward and above the center of the axle b.

My mechanism is very simple in construction as well as simple to operate. When it is desired to dump the load, the operator stands at the rear of the cart and draws the lever D back with one hand, while with the other he removes the tail-board F, which the movement of the lever releases. The act of drawing back the lever not only releases the forward end and the tail-board simultaneously, but it also serves as a handle to steady and help tip the cart and to dump the load when the horse is backed, it being readily seen that my method of connecting the thills to the cart a short distance forward and above the center of the axle or pivoting-point acts on the cart to tip it up when the horse is backed and return the body to its normal position when the horse is started again.

Having thus described my invention, what I claim as new, and desire to secure by Letters Patent, is—

1. In a dump-cart, the combination of a latch-bolt located on the side of the body pivoted at its inner end and having a head on its outer end engaging a slot in the tail-board, a catch on the forward end of the body, a hand-lever pivoted on the side of the body and extending above it, said hand-lever arranged to raise said latch and at the same time draw back said catch thereby releasing the front of the body and the tail-board simultaneously, substantially as described.

2. In a dump-cart, the combination of a latch-bolt pivoted at its inner end on the side of the body and having a head on its outer end engaging a slot in the tail-board, a catch on the forward end of the body, a hand-lever pivoted to the side of said body, and extending above it, said hand-lever engaging said latch to raise and lower it, said lever connected to said catch H, through connection I, arm J, shaft K, arm L, and connection-rod M, substantially as described.

3. In a dump-cart, the combination of a latch-bolt pivoted at its inner end and having a head on its outer end engaging the tail-board, a catch on the forward end of the body, a lever pivoted on the side and extending above it, said lever engaging said latch, mechanism operatively connecting said lever to said catch, blocks forked over the axle on which the body rests, straps secured to the body and also to said blocks, pivots in said straps for securing the thills forward and above the center of the axle, substantially as described.

4. In a dump-cart, the combination of a latch-bolt pivoted at its inner end on the side of the body and having a head on its outer end engaging the tail-board, a catch on the forward end of the body, an operating hand-lever pivoted on the side of the body and extending above it, said hand-lever engaging said latch, to raise and lower it, said lever connected to said catch H, through connection I, arm J, shaft K, arm L, and connection-rod M, blocks forked over the axle on which the body rests, straps secured to the body and also to said blocks, pivots in said strap for securing the thills forward and above the center of the axle, substantially as described.

In testimony whereof I have hereunto set my hand this 15th day of May, A. D. 1902.

AMÉDÉE LAPORTE.

In presence of—
HOWARD E. BARLOW,
M. L. HAZARD.